United States Patent Office 2,816,397
Patented Dec. 17, 1957

2,816,397
METHOD OF CONDITIONING SOIL

Wilhelm Becker, Koln-Stammheim, Fritz Schmidt, Leverkusen, and Otto Bayer, Leverkusen-Bayerwerk, Germany, assignors to Farbenfabriken Bayer Aktiengesellschaft, Leverkusen, Germany, a corporation of Germany No Drawing. Application December 2, 1954,
Serial No. 472,774

Claims priority, application Germany December 4, 1953

3 Claims. (Cl. 47—58)

The present invention relates to methods of conditioning the structure of soils and enhancing their capacity for supporting plant growth.

Various methods have been proposed to increase the yield of agricultural products by creating good soil structure. A general practice comprises improving the soil structure by adding fertilizing compositions and controlling the reaction of the soil. Addition of fertilizers, however, is inefficient if the soil structure is unfavorable to plant growth. Soils of poor structure, for instance sand, have a very limited holding capacity for water and nutrient salts; high clay content soils may retard the growth of roots and stems by formation of dense compact structure with hard impervious crusts, especially in the form of surface crusts, thereby excluding the air necessary for root respiration and optimum growth of plants. Besides, high clay content soils fail to absorb sufficient quantities of water and become soon puddled during heavy rainfall. After drying up cracks and fissures may develop which increase the rate of transfer of soil moisture to the atmosphere and may lead to injuring the plant roots. Besides, soils of poor water holding capacity lose moisture too rapidly by evaporation from the surface due to excessive capillary action.

It is known to improve the structure of clay-type soils by addition of peat, composts, manures and other organic matter. The soil structure is improved by organic additives directly by way of their porosity and indirectly by way of the decomposition products formed therefrom in the soil, which decomposition products stabilize the soil crumbs. These organic matters are required in soil conditioning in relatively large amounts but are not available in commercial quantities. Moreover, these matters have the disadvantage of being decomposed by the flora in the course of time so that new quantities thereof have to be added to the soil.

It has recently been proposed to improve the structure of high clay content soils by addition of organic polymeric compounds or polyelectrolytes. Because of their high purchase cost these compounds have not achieved significant commercial success in agriculture. It has further been suggested to improve the soil structure by addition of sand or kieselguhr. The efficiency of these media, however, is rather limited. Besides, these additives are required in very large quantities, which permits their application only for certain specialized limited cases.

It is an object of the present invention to provide compositions capable of creating good soil structure thereby permitting a substantial increase in crop yields.

Another object of the present invention is to provide suitable starting materials which, upon addition to the soil, yield compositions capable of improving the soil structure thereby permitting substantial increase of crop yields.

Further objects of the invention will become apparent as the following description proceeds.

In accordance with the present invention it has been found that improved agricultural conditions in the soil can be created and promoted by adding to the soil inorganic gel-forming substances for instance sodium aluminate, silicic acid, aluminum hydroxide, titanium hydroxide or zirconium hydroxide. It is a preferred embodiment of the invention to apply compounds which are readily converted in the soil to the aforesaid inorganic gel-forming substances. Especially suitable according to the invention are silicic acid sols as well as the esters of silicic acid which are hydrolysed in the soil by the soil moisture to silicic acid, for instance the methyl ester, ethyl ester, propyl ester of silicic acid and, among these, the so-called polysilicic acid esters having a higher silicic acid proporiton than the monomeric esters.

The efficiency of the inorganic gel forming substances used according to the invention as soil conditioners is simply demonstrated. Experiments have shown that 50–100 g. of the above-said silicic acid esters incorporated in the top-soil layer of 1 square meter of a high clay content soil result in a pronounced increase of the microporosity of soil and a satisfactory formation of soil crumbs, which properties effect a considerably improved soil aeration, a more rapid infiltration of water with less runoff during rainfall, and an increased water retaining capacity, and simultaneously substantially reduce the mechanical resistance which the clay-type soil normally offers to growing roots. Essentially higher crop yields resulted from the aforesaid effects of the new fertilizing compositions on the soil structure, for instance the crop yields of beans and cinerarias are increased to an extraordinarily high degree.

In general, the inorganic gel-forming substances of the invention are incorporated in the surface soil in amounts varying from 0.01 to 5%, preferably 0.05 to 0.5%, calculated on the soil.

As compared with the previously known organic substances, silicic acid has the advantage that it is not attacked by the soil bacteria. As silicic acid ester is readily available in commercial quantities the invention provides an efficient and economic process of conditioning and improving the soil structure.

The invention is further illustrated by the following examples without being restricted thereto.

Example 1

Clay-type soil which tends to form crusts and undesirable compaction and, therefore, is not very useful in cultivation is sprayed with 150 grams of polysilicic acid ethylester (containing 36.5% of $SiO_2$) per one square meter. The soil is then treated to a depth of 10–15 cm. After 24 hours the soil has assumed a crumbly structure and improved water-holding capacity. In this condition the soil is well prepared for cultivation including gardening. The same effect is attained by soil treatment with aluminum ethylate, titanium propylate and zirconium butylate in quantities varying between 100 and 300 grams per square meter depending upon the condition of the soil structure.

Example 2

Three portions of clay-type soil having a low moisture content were intimately mixed with 0.1% by weight of (1) Polysilicic acid methyl ester,
(2) Potassium silicate, or
(3) Sodium aluminate, then placed in dishes, and equal amounts of water were sprayed thereon in a vigorous jet every day for two weeks. Another portion of the same clay-type soil was left untreated. After drying up the test samples the untreated soil had become compact like a brick whereas the soil treated with polysilicic methyl ester readily formed crumbs upon slight pressure. The soils treated with potassium silicate and sodium aluminate showed a similar, but slightly reduced, effect.

*Example 3*

Glass tubes, 35 cm. in length and having an inside diameter of 4.6 cm., were loosely filled with 100 grams of clay-type soil in crumbs having a low moisture content after closing the bottom of the glass tubes with glass wool. 200 cc. of water each were introduced and the water draining through the glass wool was collected and measured. By measuring the amounts of water after 15 minutes it was found that the passage through the untreated soil was 10 ccm., whereas the passage through the soil treated with:

0.1% by weight of silicic dioxide sol was 27 ccm.;
0.1% by weight of potassium silicate sol was 20 ccm.;
0.1% by weight of sodium aluminate sol was 17 ccm.;
0.1% by weight of polysilicic acid methyl ester sol was 30 ccm.;
0.1% by weight of polysilicic acid ethyl ester sol was 28 ccm.

*Example 4*

Clay-type soil was placed in dishes impermeable to air and mustard seed grains were sown therein. Whereas the soil in one of the dishes was not treated, the soil in the other dish was treated with 0.1% by weight of polysilicic acid methyl ester. The untreated soil showed 56% of shooting-up spots whereas the soil treated with polysilicic acid methyl ester showed 80% of shooting-up spots. Germination diseases did not occur after adding 1% by weight of polysilicic acid methyl ester to the soil even when sowing immediately after the soil treatment.

We claim:

1. The method of improving high clay content soils for plant husbandry, which comprises incorporating in the surface soil an effective amount of a compound selected from the group consisting of aluminum alkoxide, titanium alkoxide and zirconium alkoxide.

2. The method as claimed in claim 1 wherein said compound is used in an amount varying from 0.01 to 5% by weight of soil.

3. The method as claimed in claim 1 wherein said compound is used in an amount varying from 0.05 to 0.5% by weight of soil.

References Cited in the file of this patent

UNITED STATES PATENTS 2,575,170   Holmes _____ Nov. 13, 1951

FOREIGN PATENTS 670,881   France _____ Aug. 26, 1929

OTHER REFERENCES

Soil Science Society of America Proceedings, vol. 17, No. 1, pages 76–77 (January 1953), article "Soil Aggregate Stabilizers."